United States Patent [19]

Batcheller

[11] Patent Number: 4,846,283

[45] Date of Patent: Jul. 11, 1989

[54] ENGINE-SENSING DRAFT CONTROL SYSTEM WITH MULTIPLE FEEDBACK COMPENSATION MECHANISMS

[75] Inventor: Barry D. Batcheller, West Fargo, N. Dak.

[73] Assignee: J. I. Case Company, Racine, Wis.

[21] Appl. No.: 94,218

[22] Filed: Sep. 8, 1987

[51] Int. Cl.⁴ .......................................... A01B 63/112
[52] U.S. Cl. ......................................... 172/10; 172/7
[58] Field of Search .................... 172/1, 2, 3, 4, 4.5, 172/5, 6, 7, 8, 9, 10, 11, 12, 663; 318/587, 632, 633; 364/180, 183, 424, 426

[56] References Cited

U.S. PATENT DOCUMENTS

| | | | |
|---|---|---|---|
| 2,629,306 | 2/1953 | Rusconi | 172/2 |
| 3,716,104 | 2/1974 | Koenig et al. | 172/3 |
| 3,776,322 | 12/1973 | Misch et al. | 172/2 |
| 3,834,481 | 9/1974 | Carlson | 172/7 |
| 4,077,475 | 3/1978 | Hino et al. | 172/3 |
| 4,086,563 | 4/1978 | Bachman | 324/172 |
| 4,282,933 | 8/1981 | Suganami et al. | 172/4.5 |
| 4,300,638 | 11/1981 | Katayama et al. | 172/10 |
| 4,301,870 | 11/1981 | Carre et al. | 172/7 |
| 4,343,365 | 8/1982 | Rajagopal et al. | 172/7 |
| 4,419,654 | 12/1983 | Funk | 340/52 R |
| 4,423,785 | 1/1984 | Kurihara et al. | 172/3 |
| 4,437,048 | 3/1984 | Arnold | 172/4 |
| 4,454,919 | 6/1984 | Arnold et al. | 172/1 |
| 4,458,471 | 7/1984 | Herwig | 56/10.2 |
| 4,465,142 | 8/1984 | Van der Lely et al. | 172/7 |
| 4,508,176 | 4/1985 | Wiegardt et al. | 172/7 |
| 4,518,044 | 5/1985 | Wiegardt et al. | 172/7 |

OTHER PUBLICATIONS

D. Rutkowski & J. Welchans, "The Development of an Electronic Draft Control System at Ford Tractor Operations", Proceedings of the National Conference on Fluid Power (held in Detroit, Mich. on Apr. 29–May 1, 1986), pp. 301–306.

D. Rutkowski, "Microprocessor Regulates Tractor's Draft Control System", Hydraulics & Pneumatics, Apr. 1986, pp. 63–64.

Primary Examiner—Brian S. Steinberger
Attorney, Agent, or Firm—Dykema Gossett

[57] ABSTRACT

An automatic feedback control system for use with an off-road vehicle having an adjustable-elevation, ground-engaging implement is determined by the en-tractor with a three-point hitch and a plough or cultivator, is disclosed. The automatic control system provides an engine-sensing draft control system which adjusts the height or elevation of the ground-engaging implement so as to maintain the draft or load forces experienced by the vehicle at a substantially constant level. The determination of the draft being produced by the ground-engaging implement is determined by the engine speed deviation from a target point speed which is indicated by an operator-set desired no-load engine speed and an operator-set engine lug-down value or load. To provide proper operation of the engine-sensing draft control system, multiple feedback compensation mechanisms are provided, including a throttle compensation function, an electrohydraulic valve compensation function, a slip-sensing function, a sensitivity (deadband) adjustment, a maximum implement-lowering rate function, and an automatic downshift signal function to cause the transmission of the tractor to downshift to a lower speed to avoid engine stall under certain conditions.

15 Claims, 5 Drawing Sheets

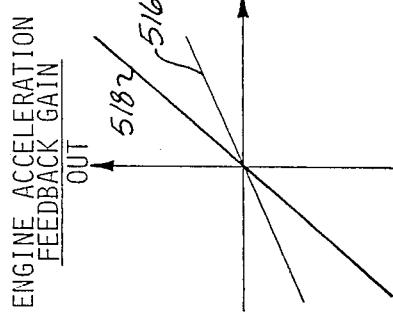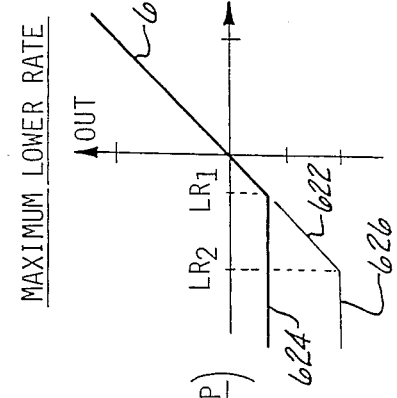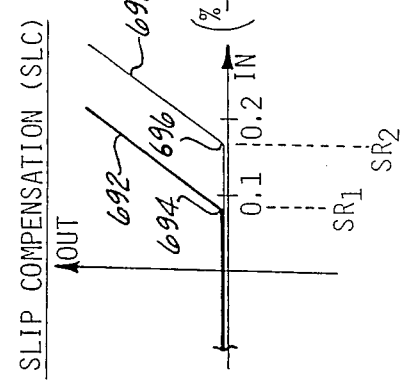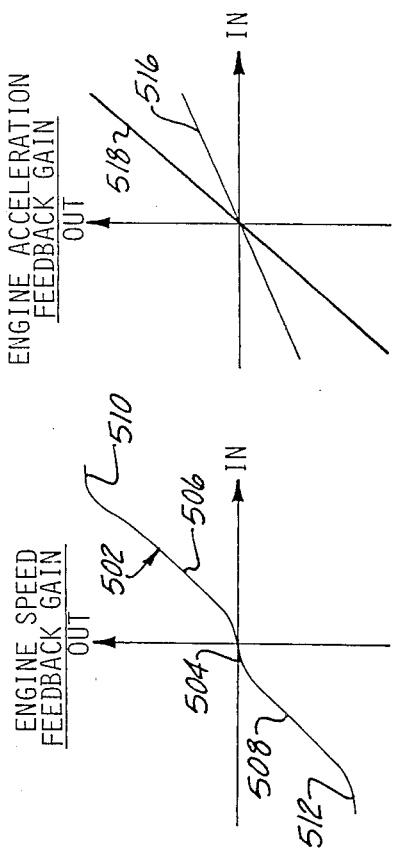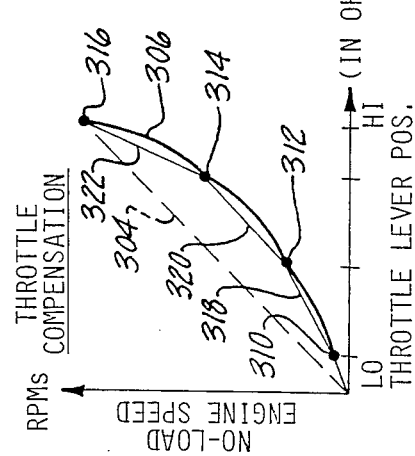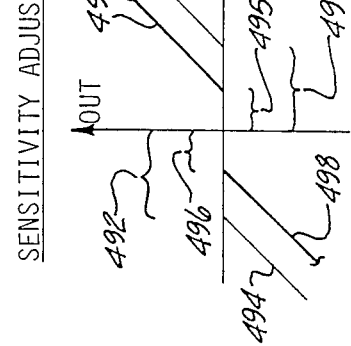

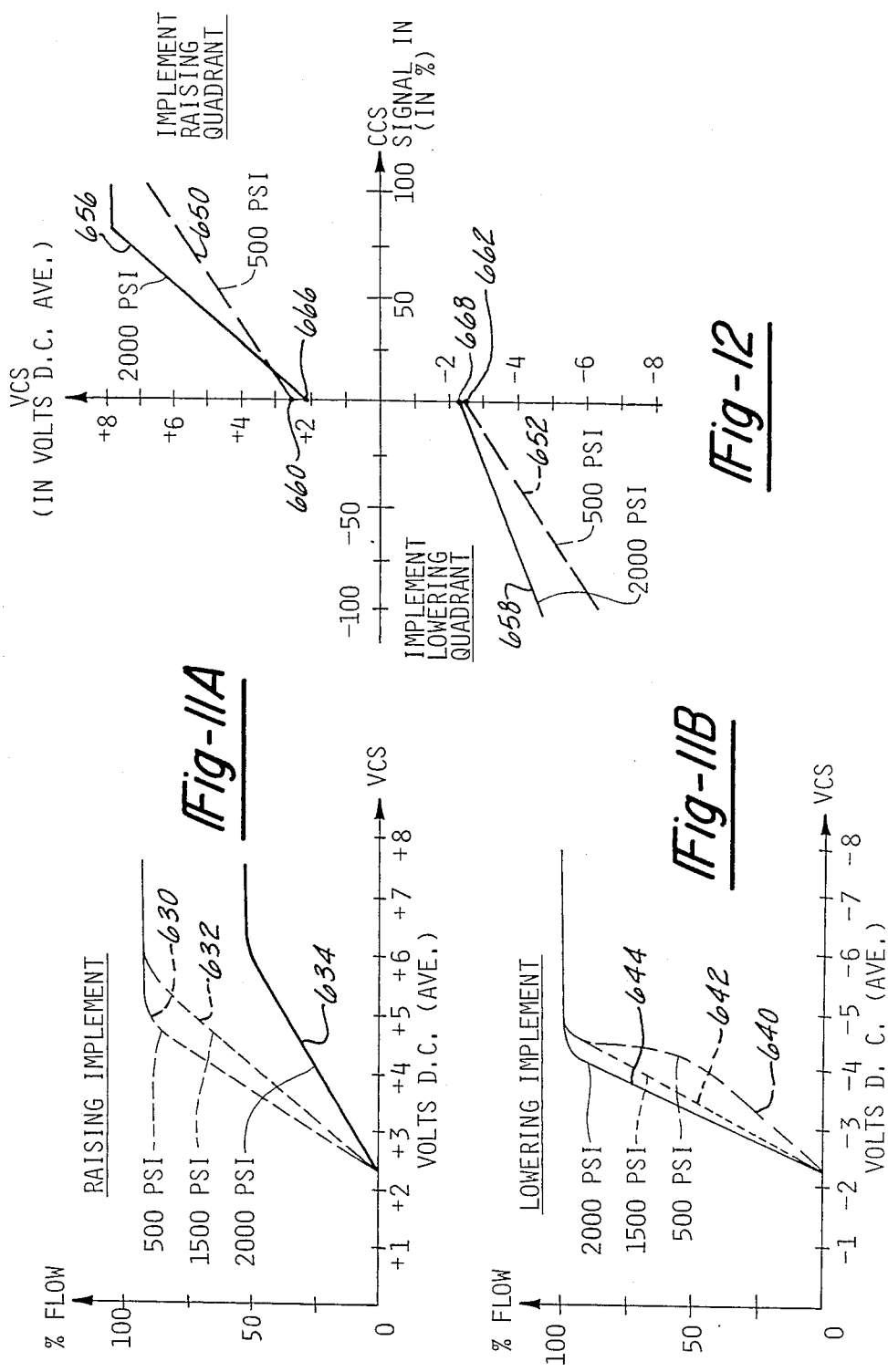

ENGINE-SENSING DRAFT CONTROL SYSTEM WITH MULTIPLE FEEDBACK COMPENSATION MECHANISMS

BACKGROUND OF THE INVENTION

1. Field of the Invention

The present invention relates in general to automatic feedback control systems for implement positioning means in off-road agricultural and construction industry vehicles, and in particular to automatic control systems for use on tractors for controlling the elevation of an implement attached thereto by connecting means such as a three-point hitch.

2. Description of the Prior Art

Agricultural tractors have traditionally employed hydromechanical draft control systems wherein implement pulling or load forces (i.e., draft) are sensed through either mechanical or electronic sensor means connected to or through an appropriate linkage. Mechanical linkages have inherently limited flexibility and high hysteresis. Electronic control sensors such as load cells also are quite expensive and subject to damage due to overloads, environmental exposure and other problems.

Many different schemes and systems have been developed to automatically control the elevation of an implement attached to an adjustable hitch on a tractor. U.S. patents which teach controlling the elevation of an implement or hitch as a function of measured draft include:

| U.S. Pat. No. | Inventor |
|---|---|
| 2,629,306 | Rusconi |
| 4,300,638 | Katayama et al. |
| 4,301,870 | Carre et al. |
| 4,343,365 | Rajagopal et al. |
| 4,437,048 | Arnold |
| 4,508,176 | Wiegardt et al. |
| 4,518,044 | Wiegardt et al. |

Other U.S. patents disclose schemes and systems for controlling hitch position as a function of wheel slip. A determination of slip is based on a comparison of the speed of one of the driven wheels of the tractor with the true ground speed, as determined by monitoring the speed of an undriven front wheel or by radar means. Such patents include:

| U.S. Pat. No. | Inventor |
|---|---|
| 3,834,481 | Carlson |
| 4,086,563 | Bachman |
| 4,344,499 | Van der Lely et al. |
| 4,419,654 | Funk |
| 4,485,471 | Herwig |
| 4,518,044 | Wiegardt et al. |

U.S. Pat. No. 3,716,104 to Koenig et al. shows the concept of controlling hitch position as a function of torque on the tractor due to implement load or draft when compared to engine RPM. U.S. Pat. No. 4,465,142 to Van der Lely et al. discloses an alternative control system which compares the desired engine speed, as set by a manual lever, against actual engine speed to obtain a difference signal which is then amplified and used to directly control an electrically activated hydraulic valve that raises or lowers a plow.

Other systems have been developed which monitor actual engine speed. For example, U.S. Pat. No. 4,077,475 to Hino et al. discloses a hitch control system with a "rotary" draft control which monitors both actual engine speed and actual hitch position. In this control mode, two insensitivity threshold sensors are used to create a deadband to prevent hunting and chattering of the solenoid valves. The difference between actual engine speed and desired engine speed is compared against upper and lower threshold values and is used to influence the operation of the hitch positioning control when the engine speed is between predetermined upper and lower speeds. Furthermore, below a yet lower engine speed, the hitch control system automatically raises the hitch to prevent the engine from stalling. The purpose of this mode to keep the working depth of the implement near its desired value, while effectively preventing any accidental engine failure due to overload conditions caused by an engine load which is too heavy for the engine to handle. This patent, however, apparently fails to recognize that the amount of engine lugdown from a predetermined set point or no-load speed can be used as a form of draft load control, since it provides a separate mode, the draft mode, which makes use of a draft force transducer to provide a constant load on the tractor by automatically adjusting the height of the hitch.

It has recently been recognized that completely eliminating mechanical draft sensors and instead using engine speed to determine draft or load force would be beneficial. In D. Rutkowski & J. Welchans, "The Development of An Electronic Draft Control System at Ford Tractor Operations," *Proceedings of the National Conference on Fluid Power* (held in Detroit, Mich. on Apr. 29–May 1, 1986), pp. 301–306, a microprocessor-based system where actual engine RPM is compared with the expected no-load RPM at a given throttle position is disclosed. This difference, namely the RPM deviation from no-load RPM, is used to calculate draft force by transforming the difference into a draft signal by matching it to the engine's performance, which is represented by a specific point on one of several engine torque curves stored in the system's memory. The system then uses this draft force signal to control a proportional electrohydraulic valve that raises or lowers the hitch. This article shows that such a draft force signal may be used in combination with a hitch position feedback signals, if desired.

In order to operate, then the system must not only be programmed with the specific engine torque curves, but must also know which one of the several torque curves to use, which requires knowing what gear the tractor's transmission is in.

Our work with engine-sensing draft control systems shows that the draft control system described in the aforementioned article has a number of limitations. In particular, a typical tractor is used with a wide variety of implements, some of which tend to dig themselves into the ground, and others of which tend to drive themselves out of the ground. Moreover, the weight of the implements varies dramatically, and this adversely influences the stability of the system. Our experiments show that a number of additional feedback compensation mechanisms, including manual controls for allowing the operator to make field adjustments, are necessary or highly desirable if an engine-sensing draft control system is to be effective for a wide variety of implements. In particular, an engine-sensing draft control system which only allows the operator to adjust the desired load tends to exhibit valve chatter, hunting and instability in a number of situations. Moreover, if the wheels begin to slip, which allows engine RPM to increase, the system mistakenly perceives that draft load is lessening and responds by lowering the hitch, which can result in the implement becoming dug in, thereby stalling the tractor. The system described in the aforementioned article requires the storage of families of engine torque curves, either as tables of values (which can take inordinate amounts of memory in a microprocessor-based control system) or as complex formulas (which can be difficult to program into a micro-processor-based controller and can require significant computation time to convert an engine lug-down value to a draft load force using such formulas). Another problem with using pre-programmed engine torque curve tables or formulas is that they are inaccurate in proportion to the variation of engine performance from ideal conditions. As the engine wears, goes out of tune, or is misadjusted, the accuracy of the conversion from engine lug-down to draft load using such torque curves becomes increasingly inaccurate. Also, knowledge of the gear ratios of each transmission and the actual gear the tractor's transmission is operating in must be obtained, which adds to the cost and complexity of implementing the system.

In light of the foregoing problems, it is an object of the present invention to provide an engine-sensing draft control system which permits the operator to manually adjust a sufficient number of key control system parameters to allow proper operation of the control system with a wide variety of implements of different weights and ground-engagement characteristics. A further object of the invention to provide a control system which is stable in operation and can compensate for the several nonlinearities commonly associated with tractor engine throttles and the hydraulic valve used to operate a three-point hitch, including those introduced by implements of varying weights. Another object is to provide a draft control system which monitors slippage and can avoid excessive slippage. Yet another object of the present invention is to provide an engine-sensing draft control system which does not require knowledge of the engine torque curve characteristics of the vehicle or knowledge of the particular gear in which the vehicle is operating in order to operate effectively.

SUMMARY OF THE INVENTION

In light of the foregoing problems and objects, there is provided an automatic feedback control system for a self-propelled vehicle. The vehicle has an engine, ground-engaging traction means, such as wheels or continuous treads, for moving the vehicle relative to the ground, and connecting means for attaching a ground-penetrating implement to the tractor. Actuating means, such as an electrohydraulic valve and cylinder, are provided for adjusting the elevation of the implement, or at least a first portion thereof attached to the connection means, so as to vary the ground penetration of the implement in response to a control signal applied to the actuating means.

In a first embodiment of the invention, the automatic feedback control system comprises: first sensing means for generating a speed parameter signal representative of the actual speed of the engine; first input means for producing a desired no-load engine speed signal corresponding to a desired no-load engine speed; second input means for producing a target speed signal which corresponds to a desired target engine speed which is less than the no-load engine speed; first difference means for generating a speed error signal representing the difference between the speed parameter signal and the target speed signal; and first control means for operating the actuating means to adjust the elevation of the first portion of the implement at least partially in response to the speed error signal.

In a preferred embodiment, the automatic feedback control system is implemented using a microprocessor-based electronic control system. The self-propelled vehicle may be an agricultural tractor, and the ground-engaging traction means may be at least a pair of driven wheels. The connecting means may be a conventional three-point hitch assembly which may include a pair of drawbar links or draft arms which are pivotally supported in spaced relation at their forward ends on the tractor. The arms are raised or lowered about their forward pivotal axes by the actuating means, which typically is a hydraulic lift assembly including a pair of spaced cylinders.

These and other aspects, objects and advantages of the present invention will be more fully understood from the following detailed description and appended claims, taken in conjunction with the drawings.

BRIEF DESCRIPTION OF THE DRAWINGS

In the accompanying drawings, where identical reference numerals or reference characters represent like items shown in the various figures:

FIG. 4 is a pair of signal magnitude versus time graphs having a common time axis and showing typical smoothing or time-averaging characteristics of the delay modules of FIG. 3;

FIG. 5 is a graph illustrating the technique of the present invention for calibrating throttle lever position to no-load engine speed;

FIG. 6 is a graph of the transfer function of a typical deadband module illustrating its adjustment by the sensitivity pot;

FIG. 7 is a graph illustrating the transfer function of the gain block in the engine speed feedback loop of FIG. 3;

FIG. 8 is a graph illustrating the transfer functions of the gain blocks in the engine acceleration feedback loops of FIG. 3;

FIG. 9 is a graph showing the transfer function block in of the slip sensing subsystem of FIG. 3;

FIG. 10 is a graph of the transfer function of the maximum lower rate block of FIG. 3;

FIGS. 11A and 11B are graphs showing the input voltage versus percent flow characteristics of an electrohydraulic valve used in the three-point hitch shown in FIG. 1; and FIG. 12 is a graph of the transfer function of the valve compensation block of FIG. 3.

DETAILED DESCRIPTION OF THE PREFERRED EMBODIMENTS

Figure 1:
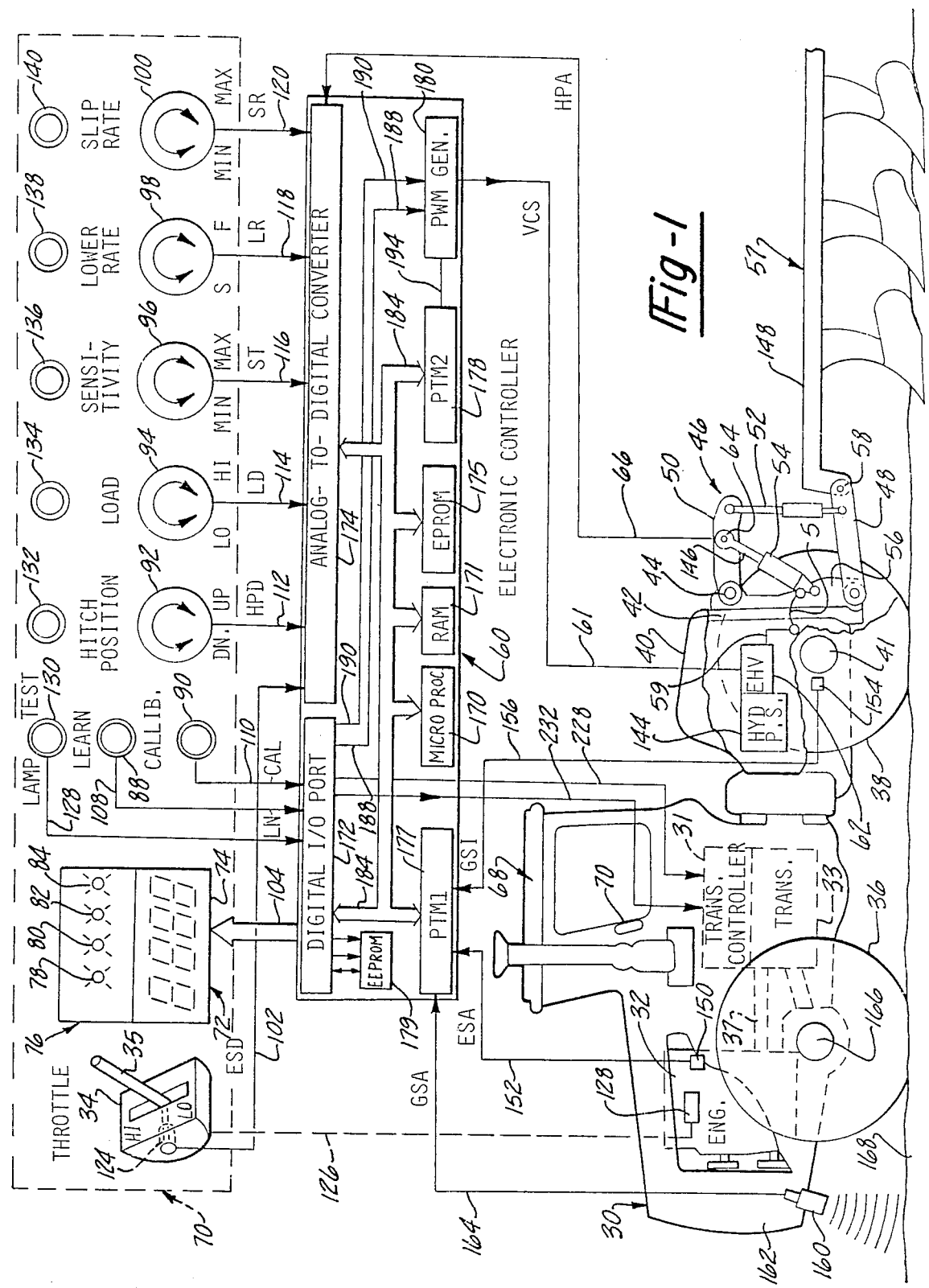
FIG. 1 is a combination diagram which shows the automatic feedback control system of the present invention including an operator's console, an electronic controller in block diagram form, and a simplified side elevational view of a tractor having a three-point hitch assembly and towing an implement, and which also shows the various interconnections between the console, controller and various components and sensors on the tractor.

Referring now to FIG. 1, a four-wheel drive articulated tractor 30 includes an internal combustion engine 32, such as a diesel engine controlled by a speed control assembly 34 including a throttle lever 35, a front pair 36 of conventional driven wheels and a rear pair of driven wheels 38, and a solenoid-operated powershift transmission 33 with an electronic transmission controller 31. Transmission 33 is connected to the engine 32 by suitable connecting means 17 and to the rear wheels 18 by another suitable connecting means (not shown). A rear housing 20 on the tractor 32 supports a rear axle 21 and a rock shaft 44. An implement hitch 46, such as a conventional three-point hitch, is mounted to a rear frame 42 of rear housing 40. Hitch 46 includes draft links 48 which are connected to lift arms 50 via a pair of lift links 52. The lift arms 50 may be rigidly connected to the rock shaft 44 to ensure simultaneous and equal movement. The lift arms 50 are raised and lowered via a pair of parallel connected hydraulic lift or rock shaft cylinders 54. A drawbar (not shown) would typically extend rearwardly from a frame 56 of the three-point hitch assembly 46 mounted on frame 42. The tractor 30 and the hitch 46 are merely exemplary, and those skilled in the art will understand that the invention can be applied to tractors and hitches of other configurations. For example, this invention can be used on two-wheel drive tractors or front-wheel row-crop tractors.

Ground-engaging implements, such as plows, discs, cultivators and rotary hoes, may be interchangeably mounted on or attached in a conventional manner to the draft links 48. In FIG. 1, a moldboard plow 57 is shown connected at the rearward end 58 of the draft links 48. The communication of hydraulic fluid to and from the cylinders 54 through a suitable hose 55 and tubing or coupling means 59 is controlled by a conventional solenoid-operated electrohydraulic directional control valve (EHV) 62. Valve 62 receives an electrical control signal VCS provided on signal path 61 from controller 60 which is the brain of automatic feedback control system of the present invention illustrated in FIG. 1. Controller 60 is preferably a microprocessor-based electronic controller, as will be described. Valve 62 may be comprised of a commercially available servo-valve with a torque motor- operated pilot stage and an integral second stage. Under controlled pressure conditions, the output hydraulic flow rate is substantially proportional to the magnitude and polarity of the electrical current control signal VCS applied to the torque motor of the valve 62. One such preferred valve is the Z4900 Series electro-hydraulic proportional three-way valve, available from Dynex/Rivett, Inc. of Pewaukee, Wis.

Located at any suitable position within the cab 68 of tractor 30 is an operator's console 70 which contains various input devices used with the control system of the present invention. One possible configuration of operator's console 70 is shown in an enlarged representation within dotted lines at the top of FIG. 1. The operator's console 70 includes the throttle lever assembly 34, a display panel 72 which may include a visual display 74 and a cluster 76 of indicator lights 78-86, two momentary contact (SPST) pushbuttons 88 and 90, and five potentiometers 95-100, all connected in conventional fashion to electronic controller 60 by suitable conductors represented by signal paths 102-120, as shown. The display 74 may be of the alpha-numeric or numeric-only LED or LCD type such as the four digit seven-segment display shown, and may be used to display appropriate messages regarding the status of the control system, including desired and actual parameter values as monitored by the control system 60, if desired. The data or signal path 104 typically will include multiple conductors as necessary to drive the display in conventional fashion. The light cluster 76 may similarly be used to display error codes and other indications of the status of the control system 60.

The throttle lever assembly 34 may include a lever position transducer 124 (such as a rotary potentiometer connected at the pivot point of lever 35, as shown in phantom). Pot 124 generates a speed command signal which represents the desired no-load engine speed signal (ESD) that is provided over line 102 to controller 60. As illustrated by dashed line 126, the throttle lever 35 is connected by suitable mechanical or other linkages to the throttle 128 of engine 32.

The five potentiometers 92-100 are all adjustable by the operator and may be of any conventional style and are preferably linear rotary potentiometers with calibrated markings thereon for easy and accurate visual reading of their settings by the operator. "Hitch position" pot 92 is used to specify the desired hitch position (i.e., elevation) between a minimum value in the extreme counterclockwise (full CCW) or "DN" position and a maximum value in the extreme clockwise (full CW) or "UP" position. The output of pot 92 is an analog desired hitch position signal HPD on line 112. "Load" pot 94 allows the operator to specify the approximate draft force he wishes the control system to attempt to maintain. The setting of this pot varies from a minimum value in the full CCW or "LO" position to a maximum value in the full CW or "HI" position, and produces an analog load signal LD on line 114. The setting of pot 94 also controls the amount of mix between the hitch position control subsystem and the draft control subsystem of controller 60, as will be further explained.

"Sensitivity" pot 96 allows the operator to adjust the sensitivity of the control system between a minimum value (in the "MIN" or full CCW position) to a maximum value (in the "MAX" or full CW position), and produces an analog sensitivity signal ST on line 116. As will be explained, the sensitivity pot is used in the preferred embodiment to adjust the amount of deadband in the various feedback loops of the control system of the present invention, so as to avoid unnecessary hunting and valve chatter.

"Lower Rate" pot 98 allows the operator to adjust the maximum rate at which the hitch will be allowed to lower. The slowest rate of lowering is achieved when pot 98 is in the "S" or full CCW position, and the fastest rate of lowering is allowed when the pot is in the "F" or full CW position. The output of pot 98 is the analog lower rate (LR) signal LR on line 118. "Slip Rate" pot 100 is used by the operator to adjust the minimum point at which the system begins to take action in order to correct for excessive slippage between the driven wheels of tractor 30 and the ground. The minimum slip rate is achieved when pot 100 is in its "MIN" or full CCW position, while the maximum slip rate which is achieved by placing pot 100 in its "MAX" or full CW position.

Input devices 130 through 140 may be momentary contact (SPST) pushbuttons, selector switches or the like. The pushbuttons 130-140 each have their own signal path, such as conductor 128, leading to the controller 60. Pushbutton 130 is a lamp test button. Each of the other pushbuttons 132-140, when depressed, causes the value of the parameter indicated by its respective one of the potentiometers 92-100 directly therebelow to be displayed on the display 74, so that the operator can easily tell the precise setting of each pot and verify correct operation of the portion of the control system used to read these pots. Pushbuttons 130-140 are optional.

The tractor 30 also includes a conventional hydraulic power supply 144 connected in conventional fashion to the power plant 32 and/or transmission 33 to provide the necessary pressurized hydraulic fluid to operate the valve 62 and cylinders 54. In a prototype of the present invention, the rods 146 of single-acting cylinders 54 are raised or extended by the application of pressurized hydraulic fluid directed by valve 62 from the power supply 144 through hoses 55. Rods 146 of cylinders 54 are lowered by the force of gravity bearing upon the front portion 148 of the implement and movable arms and links of the hitch 46 and exerting a downward force upon the rods, which, when the valve 62 connects hoses 55 to the tank of the power supply 144, causes hydraulic fluid to be metered the valve 62. By regulating the size of the opening to tank, valve 62 controls the rate at which the rods 146 are lowered. Those in the art will appreciate that the electrohydraulic valve 62 could be readily arranged to operate double-acting hydraulic cylinders where pressurized hydraulic oil is supplied to the rod ends as well as the cap ends thereof, thereby using hydraulic force to lower as well as to raise the rods of the cylinders.

The tractor 30 includes several transducers used to monitor key parameters or conditions of the tractor during operation. Specifically, an engine speed transducer 150, which may be a conventional variable reluctance magnetic pick-up that senses the movement of the teeth of the rotating engine flywheel, is used to generate an actual engine speed signal ESA provided on signal path 152 to the controller 60. In a similar fashion, speed transducer 154 is used to detect the rotation of rear axle 41 as the rear wheels 38 rotate thereabout, thus providing an indicated ground speed (GSI) signal on line 156 to controller 60. The true ground speed may be determined by a conventional Doppler radar horn 160 shown mounted at the lower front end 162 of tractor 30 by bouncing radar signals off of the ground 161. The device 160 provides an actual ground speed signal GSA indicating the true ground speed to the controller 60 over signal path 164. This signal may take the form an analog signal or a digital signal whose frequency or period varies in accordance with the true ground speed of tractor 30. The indicated ground speed and actual ground speed signals GSI and GSA are used to determine the slip rate of the tractor during operation. Any other suitable technique may be used to determine the actual or indicated ground speeds. For example, if front wheels 36 were not driven, but instead rolled freely along the ground, a transducer like transducer 154 could be mounted to sense the rotation of the front axle 166 carrying wheels 36.

The microprocessor-based controller 60 is of conventional design and includes a microprocessor 170, one or more digital I/O ports 172, one or more analog-to-digital converters 174, an erasable, programmable read-only memory (EPROM) 175, an electrically erasable, programmable read-only memory (EEPROM) 176 for storing data to be retained during power-down situations, programmable timer modules 177 and 178, and a conventional modulation (PWM) generation circuit for producing a PWM signal VCS sent via path 61 to the electrohydraulic valve 62. The modules or blocks 170-178 are interconnected by a suitable bus 184 having multiple connectors for simultaneously carrying data, address and control signal information between the blocks, in a manner well understood by those in the art. In a preferred embodiment of the controller 60, the components used for these various blocks are listed in Table 1 below.

TABLE 1

| REF. NO. | ITEM | MANU-FACTURER | PART NO. |
|---|---|---|---|
| 170 | Microprocessor | Motorola | MC6802 |
| 171 | Static RAM | Motorola | MCM6810 |
| 172 | Digital I/O Port | Motorola | MC6821 |
| 175 | EPROM | Intel | 27128A |
| 177, 178 | P.T. Modules | Motorola | MC6840 |
| 179 | EEPROM | National Semiconductor | NM9306 |

Those in the art will readily appreciate that other microprocessors and electronic configurations for implementing the control system 60 are also practical.

The pulse-width modulation generation circuit 180 produces a suitable positive or negative current signal VCS of adjustable duty cycle to the electrohydraulic valve 62 over a pair of wires represented by signal path 61. The circuit 180 has an inputs three signals, the first two of which originate over lines 188 and 190 from digital I/O port 172 and are binary signals. The first of these binary signals indicates whether the circuit 180 is to be on or off, and the second of the binary signals indicates whether the circuit is to produce a positive current (for raising the implement) or a negative current signal (for lowering the implement). Circuit 180 receives a third signal over line 194 from the second programmable timer module 178. Module 178 is programmed by instructions sent from the microprocessor 170 and produces on line 194 a digital signal having a relatively high frequency which has an average DC value proportional to the specific duty cycle desired for the PWM signal VCS applied to lines 61 in a well-known manner, which need not be described here. Further details of the implementation of a similar electronic controller using like components is provided in commonly assigned copending U.S. patent application Ser. No. 055,820, filed May 29, 1987 in the names of K. L. Brekkestran and J. C. Thomas and entitled "Electronic Control System For Power-Shift Transmission," the disclosure of which is hereby incorporated by reference.

Figure 2:
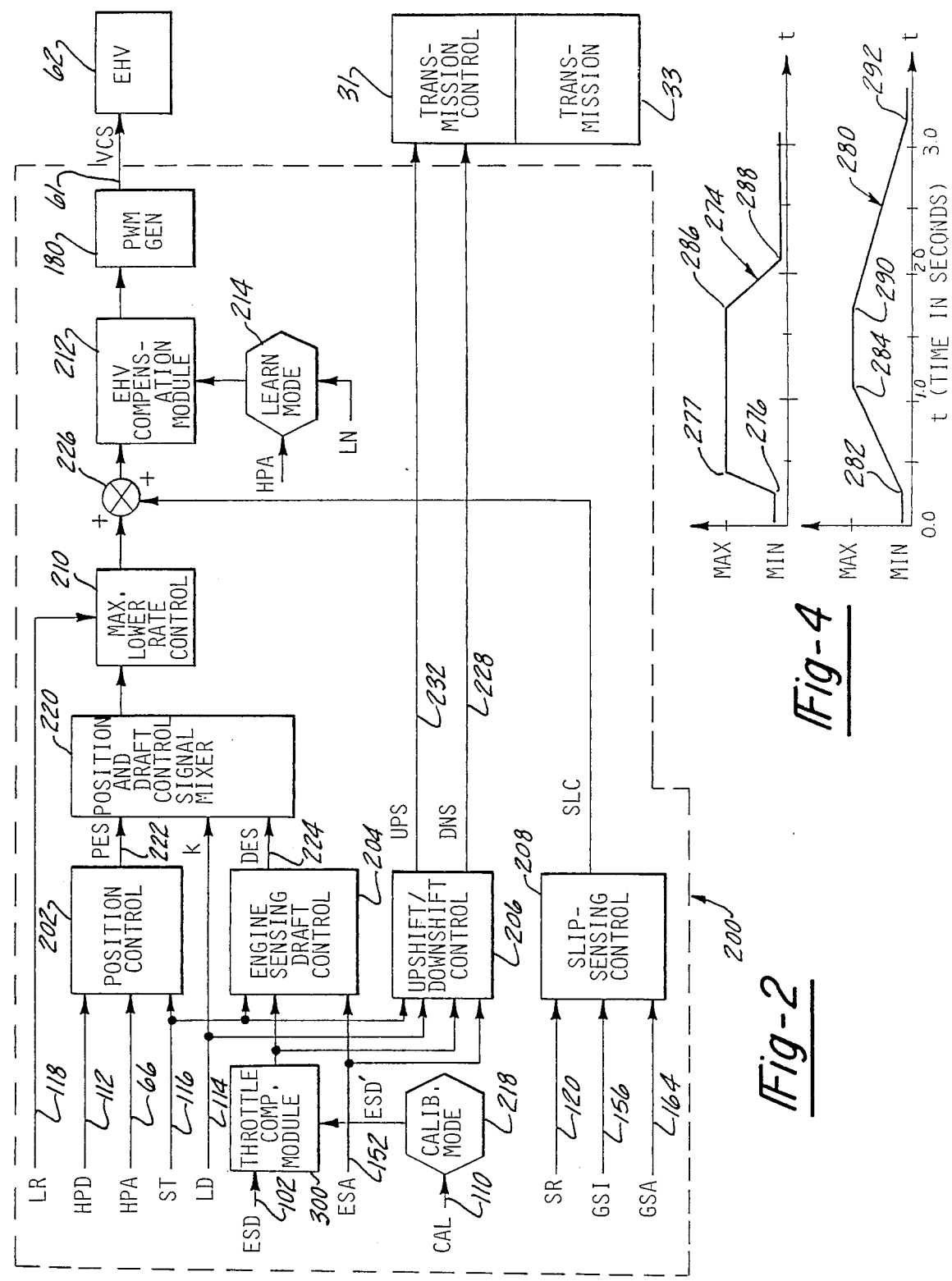
FIG. 2 is a simplified control diagram of the control system of FIG. 1 showing its major functional sub-systems.

FIG. 2 is a general block diagram showing the functional subsystems and modules or blocks of the control system of the present invention that are found within the electronic controller 60, and which may be referred to collectively as control system 200. The control system 200 has four major functional subsystems which are represented by the position feedback control module 202, the engine-sensing draft feedback control module 204, the upshift/downshift control module 206 and the slip-sensing control module 208. Other significant functional blocks within the system include the maximum lower rate control module 210, the electrohydraulic valve compensation module 212, the learn mode control module 214 used to program or set up the compensation module 212, the throttle compensation module 216, and the calibration mode control module 218 used to program or set up the throttle compensation module 216. Blocks 202–218 each make an important contribution to increasing the overall effectiveness of the automatic feedback control system of the present invention. The engine-sensing draft control 204, the upshift/downshift control 206, the slip-sensing control 208, the maximum lower rate control 210, the combination of the EHV compensation module 212, learn mode control 214, and the combination of the throttle compensation module 216 and the calibration mode control 218 each are believed to represent a significant contribution in themselves to the advancement of the electronic draft control art. As those in the art will readily appreciate, it is not necessary to use all of the modules or blocks 202–218 to have an effective draft control system. For example, the engine-sensing draft control 204 and slip-sensing control 208 could be used without the position control 202. Similarly, the engine-sensing draft control 204 can be used with the maximum rate lower control 210 and the compensation modules 212 and 214 without using the upshift/downshift control 206 or the slip-sensing control 208. Those in the art will readily see other combinations of the major blocks of the present invention which are capable of operating independently as an effective automatic feedback draft control system. However, it will also be appreciated that the overall performance of the draft control system of the present invention improves as more and more of these blocks and modules are used in combination.

The overall control system 200 also includes a position and draft control signal mixer block 220 which receives as inputs a position error signal PES over signal path 222 from position control module 202 and a draft error signal DES over signal path 224 from the engine-sensing draft control module 204. The mixing module 220 allows the operator to manually select, by adjusting the load pot 94, the relative influence that the error signals PES and DES from modules 202 and 204 will have upon the raising and lowering of the hitch. Specifically, as the load signal LD on data path 206 increases in value, the relative influence of the signal PES is decreased, while the relative influence of the signal DES is increased, in a manner that will be made clear shortly.

The position control 202 forms the portion of the position error loop in the control system of the present invention. It receives as inputs the desired hitch position signal HPD, the actual hitch position singal HPA and the sensitivity signal ST, which is used to adjust the size of the deadband in the position error feedback loop. The engine-sensing draft control 204 forms the main portion of the draft error feedback loop in the control system of the present invention. It receives as inputs the sensitivity signal ST which is used to adjust the size of various deadbands in the draft error feedback loop, the desired engine speed signal ESD, as compensated by module 216, and the actual engine speed signal ESA. The draft control system 204 is part of a closed loop control algorithm implemented in the electronic controller 60 which compares the desired engine speed against the actual engine speed and sends the draft error signal DES through mixer 220, lower rate control module 210, signal summer 226, and value compensation module 212 to the valve 62 to raise and lower the implement so as to maintain the desired value of engine lug-down specified by the signal LD from the load pot 94. The draft control system of the present invention relies upon the fact that the amount of engine lug-down, that is, reduction in engine speed or RPM from a desired no-load engine speed or RPM specified by signal ESD from the throttle pot 124, generally corresponds to a specific load force being generated by the engine 32 as it pulls the implement 57 through the ground. Assuming that tractor 30 is being operated upon reasonably level or gently sloping ground, where the load placed upon the engine due to the work which must be done to move the tractor over the ground is relatively constant, the variations in engine load will correspond to variations in draft force caused by conditions associated only with the implement, and the variations in engine speed will correspond to variations in draft load. We recognize that there can be a fair amount of uncertainty as to precisely what the actual draft (as measured in pounds or newtonmeters) is upon the tractor when measured by the amount of engine lug-down. This is particularly true when the gear in which the vehicle is operating the engine torque curve, and the amount of engine power dissipated as drive train losses and in the dynamic and continuous deformation of the driven wheels, are not known by the electronic controller 60. However, we have discovered that this uncertainty as to the precise draft being produced by the implement is not an impediment to the farmer who simply wishes to operate his tractor/hitch/implement combination at a relatively constant draft perceived as optimum by him without having to continuously attend to the adjustment of the elevation of the hitch to prevent stall outs, dig ins and to avoid unnecessarily shallow plowing, cultivation or the like. Therefore, of far greater importance than a knowledge of the precise draft which the implement 57 is generating is the ability of the control system 200 to ensure that (1) tractor 30 does not stall out, (2) implement 57 does not become dug in and (3) the hitch position is at or near its lowest practical elevation without constant hunting and other instabilities associated with some other prior art draft control systems.

The upshift/downshift control 206 receives as inputs the sensitivity signal ST, the compensated desired engine speed signal ESD' and the actual engine speed signal ESA. When the control system 206 detects that the actual engine speed has fallen too far below the target point engine speed, it generates a downshift signal DNS which is delivered via signal line 228 to the transmission controller 31 associated with and regulating the operation of transmission 33, which causes the transmission to be shifted into a lower gear, thereby providing more torque to prevent engine stall-out. When the engine speed increases to a predetermined level, such as within a predetermined number of RPMs of the desired no-load engine speed as indicated by signal ESD', the control system 206 will produce an upshift signal UPS which is delivered via line 232 to transmission controller 31 and which causes the transmission 33 to be shifted to the next higher gear. The predetermined upshift threshold speed may be set at any suitable value above or below the desired no-load engine speed. The upshift signal means and the downshift signal means each may also and preferably do monitor a rate change of engine speed. Thus, the downshift signal would only be produced after the actual engine speed has fallen below a minimum downshift threshold speed and the engine speed is decreasing at at least a predetermined minimum rate, which suggests that the engine will definitely not be able to recover without downshifting the transmission 33.

The throttle compensation module 216 and calibration mode control module 218 are used to compensate for the nonlinearities between the position of throttle lever 35 (as the input) and the corresponding no-load engine speed produced by such settings. The calibration mode control 218 causes the electronic controller 60 to perform a sequence of steps in accordance with programmed instructions resident in the static RAM 171 to allow the nonlinear characteristics to be determined while the operator moves the throttle lever 35 in a specified manner, as will be further explained with regard to FIG. 5. In a similar manner, the valve compensation module 212 and the learn mode control 214 allow the electronic controller 60 to adjust for the nonlinear electrohydraulic characteristics of the valve 62, which are heavily influenced by the weight of the implement 57 upon the draft arms 48, which weight can directly and proportionally affect the force and therefore the hydraulic pressure and flow during the raising and lowering of hitch and implement.

Figure 3:
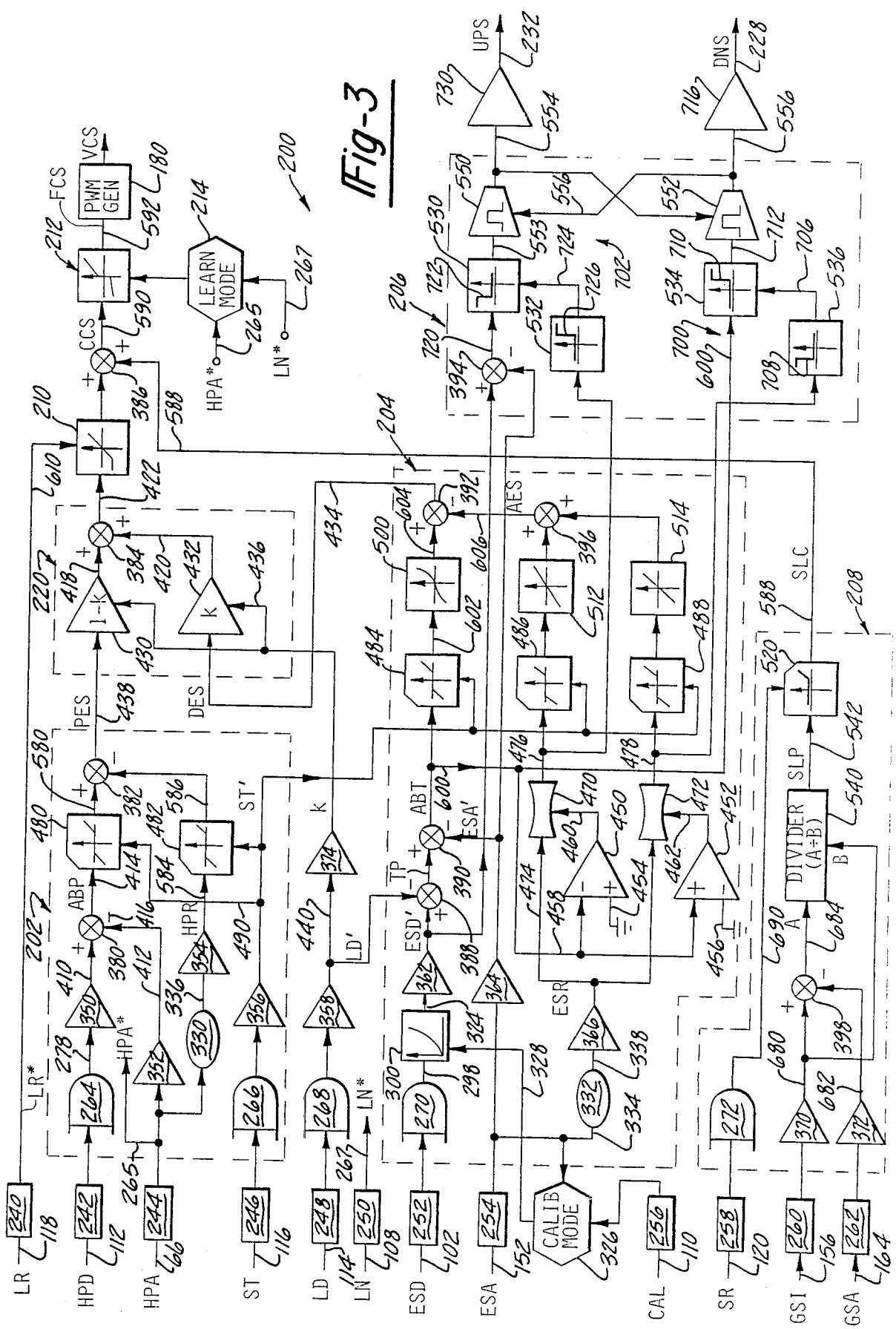
FIG. 3 is a detailed block diagram showing the signal flow and signal processing employed in the control system of FIG.1.

FIG. 3 is a detailed block diagram illustrating the signal flow and inner workings of the feedback loops and control algorithms of control system 200 implemented in electronic controller 60. Those skilled in the art will readily recognize and be able to interpret the various graphical symbols and blocks shown in FIG. 3 and will also appreciate that the automatic feedback control system 200 shown in FIG. 3 may be implemented by using conventional discrete electronic circuitry and hardware, or by using a programmed microprocessor-based controller with integrated circuit components of the type referred to in the description of FIG. 1. Armed with the detailed description herein, those skilled in the art will be readily able to implement the control algorithms and strategies described herein, using routine electrical circuit design and/or programming skills, without undue experimentation. To the extent that equations would be helpful or are necessary to the understanding of the invention, they are described below, shown in the signal flow representation presented in FIG. 3, or in the graphs of various functions in FIGS. 4–12.

The various modules shown in FIG. 2 are presented once again in FIG. 3 in more detailed form. Specifically, the modules 202–208 are shown as blocks formed by dashed lines, with one or more control blocks therein. The control system 200 shown in FIG. 3 includes input blocks 240–262, shown along the far left-hand side of FIG. 3, which represent conventional signal-conditioning circuits and/or buffers used to convert the unfiltered digital and analog input signals shown in FIG. 1 into usable digital signals of the type which can be processed by microprocessor-based controller 60. Analog input signals such as the signals from the potentiometers 64, 92–100 and 124 shown in FIG. 1 require conversion to corresponding digital values. This function is performed by analog-to-digital converter 174 shown in FIG. 1 and is functionally represented by respective input blocks 244,242,248,246,240 and 252 shown in FIG. 3. The corresponding digital value for the actual hitch position signal HPA is indicated by an asterisk following the symbol HPA on line 264. Similarly, the digital representation of the learn signal LN on line 108, transformed by input block 250, is shown as signal LN* on line 266. The actual engine speed signal ESA on line 152, the indicated ground speed signal GSI on line 156, and the actual ground speed signal GSA on line 164 preferably are pulsating signals which each have a frequency proportional to its sensed parameter. The determination of the average period or frequency of these signals is performed by programmable timer module 177 shown in FIG. 1. Upon request from microprocessor 170, module 177 outputs digital values onto bus 184 which correspond to the respective sensed parameters, namely actual engine speed, indicated ground speed and actual ground speed. This measurement and transformation function is represented by input blocks 254,260 and 262.

In a linear control system of the type shown in FIG. 3, a rapid change in a command signal, such as desired hitch position HPD, the sensitivity signal ST, the load signal LD, or the slip rate signal SR, can produce abrupt and undesirable rapid movement of the implement. To greatly reduce or eliminate the opportunity for the operator to introduce such transient conditions into the control system 200 by abruptly changing one or more these signals, an averaging or delay function is employed to smooth out rapid changes in such digital signals. This delay function is represented by delay blocks 264 through 272 which respectively further condition the digital representation of signals HPD, ST, LD, ESD and SR. A typical example of this smoothing or filtering function performed by blocks 264 through 272 is illustrated in the time graphs of FIG. 4. Segmented line 274 in the upper graph represents the average value of the digitized output of an exemplary pot, such as pot 92, which is changed from a minimum value at point 276 to a maximum value at point 277 in about 0.2 seconds. The delay block, such as delay block 264 shown in FIG. 3, produces an output on signal path 278 as shown by segmented line 280 in the lower graph of FIG. 4. Line 280 illustrates that the output signal on path 278 rises from the same minimum value at point 282 to a maximum value at point 284 in a considerably longer period of time such as 0.9 seconds. Similarly, when the digitized value of line 274 begins to fall at point 286 from its maximum value to its minimum value at point 288, the output signal on path 278 falls much more slowly as shown by the shallower slope between points 290 and 292. Those in the art will readily appreciate that there are similar conventional averaging techniques for performing such smoothing or filtering function which are all well-suited to prevent undesired transient conditions being induced by rapid adjustment of the command pots.

The conditioned and filtered value of the desired engine speed signal output on line 298 is further conditioned by transfer function block 300 in order to compensate for the nonlinearity between the relative position of the throttle lever 35 as determined by rotary pot 124 in comparison to the no-load engine speed which is produced by such setting of lever 35. FIG. 5 is a graphical representation of this nonlinearity. In the preferred embodiment of the present invention, rotary pot 124 has linear output characteristics so that the degree of pot rotation corresponds to the angular movement of the throttle lever 35. However, due to the inherent nature of the conventional linkage (represented by line 126) between the throttle lever 35 and the throttle 128, as well as the nonlinear characteristics between the position of throttle 128 and the actual no-load engine RPM, the relationship between throttle position as determined by the pot 124 and the engine speed can be and typically is rather nonlinear. Dashed line 304 in FIG. 5 represents an ideal linear relationship while line 306 represents a typical actual characteristic between throttle pot position and no-load engine speed.

Calibration mode module 218 is provided to simplify the acquisition of the data required to calibrate or set up transfer function block 300 for a given tractor/engine combination. Module 218 represents electronic controller 60 being programmed to select three or more points along curve 306 where data is acquired, so that a linear interpolation between the two adjacent points nearest the actual throttle pot setting can be performed by block 300 to determine or closely approximate the true no-load engine speed that is desired. The sequence of steps performed by the operator and the controller 60 to perform this calibration of transfer function block 300 will now be described. With engine 32 warmed up, the vehicle 30 at rest and transmission 33 in neutral, the operator advances throttle lever 35 from its minimum or "LO" position until the first of the plurality of points, namely point 310, is reached. The operator knows when he has reached point 310 because the controller 60 turns on the first indicator light 78 on the display panel 72. After a predetermined period of time, such as two or three seconds, to allow the engine speed to stabilize, electronic controller 60 takes a reading of the actual engine speed via signal ESA on line 152 and stores the read value corresponding to this RPM in its memory. Thereafter, the operator slowly advances the throttle lever until the second point 312 is reached, at which time the second indicator light 80 comes on to notify the operator that that point has been reached. After a delay of two or three seconds, a second reading of the engine RPM is taken and stored. This procedure is repeated for points 314 and 316, with third and fourth indicator lights 80 and 82 respectively being turned on by the controller 60 when the operator has moved the throttle lever 35 sufficiently to reach each respective point so that no-load engine speed readings can be taken as before. In this manner, the controller 60 learns a sufficient number of points along curve 306 in order to perform a reasonably accurate linear interpolation between points, as represented by straight line segments 318, 320 and 322. Those skilled in the art will appreciate that a greater number of points could be selected if desired. We have found that in the control system of the present invention, the calibration of the signal from the throttle pot 124 to take into account the nonlinearities of the throttle 128 and engine 30 before it is used in the feedback loops is extremely important. It should be appreciated that the graph of FIG. 5 also represents the transfer function performed by block 300. In other words, the value of the input signal on line 278 may be graphed along the horizontal axis of FIG. 5, and the corresponding output signal may be read upon the vertical axis of FIG. 5, along the segmented lines 318-322. In practice, the controller 60 interpolates as necessary between the points 310-316 to calculate an output from any given input. In FIG. 3, the hexagonal block 326 and the data path 328 provided as an input to transfer function block 300 represent this sequence of steps required for calibrating block 216.

The position control 202 and the draft control 204 both utilize a second order feedback loop, which means that the derivative of the first order feedback signal is taken. In the case of position control 202, the first order feedback signal is the actual hitch position HPA. In the draft control 204, the first order feedback signal is the actual engine speed ESA. Oval blocks 330 and 332 respectively represent the function of taking the derivatives of the HPA signal on line 265 and the ESA signal on line 334. There are several well-known, digital techniques and several well-known analog techniques for taking derivatives of signals and electronic control systems which those skilled in the art are familiar with and thus need not be described here. The rate of change of actual hitch position is thus provided on signal path 336 while the rate of change of actual engine speed is provided on signal or data path 338.

Triangular blocks 350-374 are amplifiers which are provided to perform a scaling function upon respective signals passing therethrough. This scaling function is typically necessary to place the signals into a range comparable with the othe signals with which they are to interact, and is well understood by those in the art. Circular symbols 380 through 398 represent summation points where signals are combined. For example, in position control 202, the signal output on data path or line 412 by amplifier 352 is subtracted from the signal output by amplifier 350 on line 410, and the resulting difference is output on line 414. The subtraction operation is indicated by the minus sign 416 adjacent to line 412. In mixer block 220, the signal on path 418 is added to the signal from path 420 by summer 384, and the result is output on path 422. The other summers 382 and 386-398 operate in a similar manner to either summer 380 or summer 384.

In mixer 220, the triangular blocks 430 and 432 represent an adjustable amplification function. Amplifier 432 amplifies the draft error signal DES on path 434 by the value k delivered by data path 436, while the amplifier 430 amplifies the position error signal PES delivered on line 438 by the value $(1-k)$ and outputs the result on data path 418. The value of the parameter k is directly proportional to the value of the load signal LD delivered by line 114 from the load pot 94. The amplifier 374 scales the signal on line 440 so that the value of k ranges between a minimum of 0.00 and a maximum of 1.00. Thus, mixing means 220 provides a familiar technique for allowing a control signal of adjustable magnitude to regulate the relative influence of two input signals, namely signals PES and DES in accordance with the setting of the load pot 94. When signal LD from pot 94 is at its maximum, the draft error signal DES is provided to line 420 at full strength, while the position error signal PES does not pass through amplifier 430. Conversely, when the load signal LD is at its minimum, only the position error signal PES is passed through mixing block 220. Of course, any desired decimal fraction combination of the signals PES and DES which adds up to 1.00 can also be achieved by block 220 by suitable adjustment the load pot 94.

The triangular blocks 450 and 452 in the draft control 204 are drawn as open-loop differential amplifiers and represent signal comparators. Lines 454 and 456 shown connected to ground represent input values of zero. When the signal on line 458 is above zero, the output of comparator 450 is at a minimum value or logical zero, while the output 462 is at a maximum value or logical one. When the value on data path 458 is below zero, output 460 of comparator 450 is at a maximum or logical one value, while the output 462 of comparator 452 is at a minimum or logical zero value. The bow tie-shaped blocks 470 and 472 represent a function, which in an analog circuit might be called a gated switch. In other words, when the control signal on line 460 is in a logical one state, the data signal on input line 474 will pass through to output line 476 with no change in value; when the signal on line 460 is in a logical zero state, the signal on input line 474 is not passed to line 476, and instead the output value on line or data path 476 remains at zero. In a similar fashion, gated switch 472 passes the signal on input line 474 to the output line 478 when the gate line 462 is in a logical one state, while placing a zero value on line 478 when the gate value 462 is in a logical zero state.

The transfer function blocks 480 through 488 each have two inputs and one output, and may be called adjustable deadband blocks. Their collective purpose is to provide a deadband or dead zone about the desired hitch position and about the target point engine speed so that the control system 200 will not attempt to make any adjustment to correct for hitch position error below a certain absolute magnitude, or to correct for engine speed error below a specified absolute magnitude. Providing such dead zones about the desired hitch position helps greatly reduce value chatter and hunting, thus prolonging the life of the affected equipment such as valve 62 and hydraulic power supply 144. The input on the left of each block 480-488 is a data signal, while the input on the bottom from line 490 is an adjustable control signal, the value of which is directly proportional to the magnitude of the sensitivity signal ST from the sensitivity pot 96. The control signal ST' on line 490 is used to vary the size of the deadband in the transfer function implemented by blocks 480 through 488. A typical transfer function for blocks 480-488 is shown in the graph of FIG. 6. Each such block provides a deadband region about the vertical axis of variable size depending upon the setting of the sensitivity pot 96. When the sensitivity pot 96 is set towards it minimum value, the size of the deadband indicated by regions 491 and 492 is large. The light, sloped lines 493 and 494 are straight and have a slope of 1.00, and indicate that any signal passing through one of the blocks 480-488 is reduced in magnitude by one-half of the overall size of the deadband of that block. As the sensitivity signal ST is increased towards its maximum value, the size of the overall central deadband provided by the transfer function decreases, as indicated by the smaller deadband regions 495 and 496 and the heavy sloped straight lines 497 and 498. Line 497 and 498 also have a slope of 1.00. Thus, each of the blocks 480-488 provides a deadband zone which decreases the magnitude of the signal passing therethrough by an amount equal to one-half of its deadband value, as is inversely determined by the value of the sensitivity signal ST. The size of the deadband zones from block to block can be different if so desired.

A number of other transfer function blocks are used in the control system 200 illustrated in FIG. 3. The transfer function block 500 controls the gain of the speed feedback circuit in the draft control 204, and its typical operation is illustrated by the nonlinear segmented or curved line 502 in FIG. 7. The gain of the speed feedback control loop is preferably reduced in the vicinity of the vertical axis as indicated by shallowly-sloped line segment 504, which passes through the origin of the graph in FIG. 7. The slope thereafter increases, as indicated by line segments 506 and 508, before being preferably reduced somewhat, as represented by shallowly-sloped line segments 510 and 512, at the outer limits of the system operation. The slope of lines 506 and 508 may be made unequal if desired. The transfer functions of blocks 512 and 514 in draft control system 204 is illustrated in FIG. 8 by straight lines 516 and 518 respectively, but can also be nonlinear if desired. These blocks control the gain in two paths of the acceleration feedback loop with draft control module 204, as will be further explained. Those in the art will appreciate that the nonlinear transfer blocks shown in FIG. 3 can readily be implemented in software or firmware by using tables of programmed values, wherein the value of an input signal may serve as an index to access the entries of a table, which correspond to output values.

Another transfer function block in control system 200 is block 520 used in the slip-sensing control system 208. The transfer function of block 520 will be explained with respect to FIG. 9. Transfer function blocks 530, 532, 534, and 536 will be explained later with the explanation of the upshift/downshift control system 206. Transfer blocks 210 and 212, are used in the maximum lower rate control module and in the electrohydraulic valve compensation module, respectively, and will be explained by illustrations in FIG. 10 and FIGS. 11 and 12. A divider function block 540 in the slip-sensing control system 208 simply divides the input signal A by the input signal B and provides a resulting quotient as a signal on data path 542. In the upshift/downshift control system 206, the trapezoidally-shaped blocks 550 and 552 each represent a single-shot function. Single-shot 550 is typical of both and it generates a momentary logical one output on line 554 in response to a logical one input signal on line 553, and will not generate another momentary positive pulse until a reset signal is received at its reset input connected to line 556. The reset signal on line 556 is provided by the output of the other single-shot block 552. Similarly, the output signal of single-shot 550 is used to reset the single-shot 552.

The signal flow and general operation of the control system 200 may now be described. The hitch position feedback control 202 receives the desired hitch position signal HPD and the actual hitch position signal HPA from input buffers 242 and 244, and then filters and scales the HPD signal and scales the HPA signal. Then, at a summing block 380, it subtracts the buffered and scaled value of the actual hitch position on line 412 from the buffered, filtered and scaled value of the desired hitch position signal on line 410. The resulting output signal from summer 380 on line 414 is an amount below position (ABP) signal indicating the relative amount or distance that the hitch is below the desired hitch position, indicated by the setting of hitch position pot 92. The deadband block 480 only permits an output signal to be provided on line 580 if the magnitude of the ABP signal exceeds one-half of the deadband zone size, as specified by the conditioned, filtered and scaled value on line 490 representing the setting of the sensitivity pot 96. The hitch position rate (HPR) signal on line 584 is similarly reduced in magnitude by deadband block 482 before being output on line 586. The signal on line 586 is subtracted from the signal on line 580 by summer 382 to produce the position error signal on line 438. The PES signal is reduced in size by the multiplier value $(1-k)$ where k is a value determined by the setting of the load pot 94 as previously explained. This reduced PES signal on line 418 is added to the signal (if any) on line 420, and the resulting is output on line 422, and after passing through transfer function block 210 is added to the signal from line 588 by summer 386 to produce the combined control signal CCS on line 590. The CCS signal is modified by transfer function block 212 to produce the final control signal FCS on line 592 which is provided to the PWM generation circuitry along signal path 592, which corresponds to conductors 188,190 and 194 in the controller 60 shown in FIG. 1. The PWM generation circuitry 180 converts the FCS signal to the PWM signal VCS applied to the electrohydraulic valve 62.

The engine-sensing draft feedback control 204 forms part of a closed-loop control algorithm which regulates the height of the implement so as to maintain the engine speed at a calculated target point engine speed, which corresponds to a desired engine load set by the operator using load pot 94. The target point engine speed is calculated from settings of the throttle lever 35 and the load pot 94. The setting of the throttle lever 35, as read by pot 124, produces the desired engine speed signal ESD, which indicates the desired no-load engine RPM (once the transfer function block 300 has been calibrated as described above). The conditioned, filtered, calibrated and scaled desired engine speed signal may for convenience be referred to as signal ESD'. The conditioned, filtered and scaled load signal LD' on line 440 is subtracted by summer 388 from the signal ESD' to generate a target point signal TP, which corresponds to the desired RPM that the tractor/engine/implement combination should ideally be maintained at by the closed-loop draft control, if 100% draft control is selected (that is, k=1). Thus, the target point signal directly corresponds to a desired engine RPM under load. The conditioned and filtered actual engine speed signal ESA' is subtracted from the target point signal TP by summer 390 to obtain the "amount below target" signal ABT on line 600, which corresponds to the deviation of the actual engine speed of engine 32 below the target point engine speed. The ABT signal is reduced in size by deadband block 484, which produces an output only if the value of the ABT signal exceeds one-half of the size of its deadband. The gain block 500 then amplifies the signal on line 602 in accordance with its transfer function, and this amplified speed error signal SES on line 604 is passed to summer 392.

The draft feedback control 204 may also generate an amplified acceleration error signal AES on line 606 that is provided as an input to summer 392, where it is subtracted from the SES signal. The AES signal on line 606 is produced in the following manner. The derivative of the actual engine speed signal from buffer 254 is taken by derivative block 332 and scaled by amplifier 366. The scaled output of amplifier 366 represents the acceleration of the engine and may be called the engine speed rate signal ESR, which is delivered by line 474 as an input to gated switches 470 and 472. If the signal ABT is positive, indicating that the actual engine speed is below the target point speed, comparator 452 turns switch 472 on, allowing the signal ESR to pass to line 478. If the signal ABT is negative, indicating that the actual engine speed is above the target point speed, comparator 450 turns on a switch 470, allowing the signal ESR to pass through to line 476. Switches 470 and 472 cannot be on at the same time. Thus, it will be appreciated that transfer function blocks 486 and 512 condition the signal ESR only when the engine speed is above the target point speed, while the transfer function blocks 488 and 514 condition the engine speed signal only when the engine speed is below the target point speed. Note that the gain imparted to the signal ESR by block 514 is shown as being greater than that of block 516. Through testing of prototypes of the present invention, we have determined that some additional gain is very desirable in the acceleration feedback circuit of draft control system 206 when the engine speed is below the target point speed, since it improves the performance and response of the engine-sensing draft control system significantly. The amount of increased gain may be determined by experiment for any given engine/valve 62 combination. The summer 396 provides the output of blocks 512 and 514 to line 606 without change. Thus, it will be appreciated that the second order feedback signal ESR is provided to summer 369 either through the serial path consisting of gated switch 470 and transfer function blocks 486 and 512, or through the serial path consisting of gated switch 472 and transfer function blocks 488 and 514, with the transfer function blocks in each path modifying the signal in the manner previously described. The signal AES on line 606 is subtracted from the signal SES on line 604 by summer 392 and is provided as the draft error signal DES on line 434 of the mixer block 220. Signal DES is amplified by the value k, and thereafter flows through the serial signal path consisting of summer 384, block 210, summer 386 and block 212 to the PWM generator circuit 180, where it emerges as part of signal VCS.

The maximum lower rate control block 210 provides a means for limiting the rate at which the electrohydraulic valve 62 may lower the rods 146 of hydraulic cylinders 54 and, accordingly, the implement 57. Specifically, the lower rate signal LR on line 118 from pot 98 is provided as a second input to the control block 210 and its value determines the maximum rate at which the hitch will be allowed to be lowered. The transfer function implemented by block 210 is shown in detail in FIG. 10. Slanted lines 620 and 622 have a unity slope, while lines 624 and 626 are substantially horizontal. Heavy lines 620 and 624 represent the transfer function of block 210 when the lower rate pot 98 is in a first position $LR_1$ near the full CWW setting of pot 96, while the light lines 622 and 626 as well as heavy line 620 represent the transfer function of block 210 when the pot 98 is in a second position $LR_2$ near the full CW setting of pot 98. By adjusting the load rate pot 98, then, the operator can control the rate at which the control system 200 will cause the implement 57 to be lowered as desired. This proves particularly useful when the operator is operating near the power limit of the tractor, since the operator can reduce the lower rate to provide further assurance that the implement 57 will not stall out or dig in the tractor. Also, lower rate pot 98 helps assure that the implement will not be dropped too quickly when the operator, after raising the implement to make a 180 degree turn in the field, lowers the implement in preparation for resuming cultivation or plowing.

The valve compensation module 212 compensates for the nonlinearities in the operation of the electrohydraulic valve 62, which may significantly change with the weight of the implement. FIGS. 11A and 11B are graphs of the performance of a Dynex/Rivett Z4900 Series electrohydraulic proportional three-way valve used in testing prototypes of the control system of the present invention on a Steiger tractor of the type shown in FIG. 1. FIG. 11A shows the percent flow output as a function of the average DC volts input by signal VCS to valve 62. Curves 630, 632 and 634 graphically illustrate how the percent flow significantly decreases as the hydraulic pressure increases from 500 PSI, to 1500 PSI, and to 2000 PSI. Similarly in FIG. 11B, the percent hydraulic flow output by valve 62 is shown as a function of the average DC volts input by signal VCS to the valve 62. Specifically curves 640, 642 and 644 show that the percent hydraulic flow increases as the hydraulic pressure created by gravity bearing upon the implement 57 and movable portions of hitch 46 increases. Thus, it will be appreciated that the changing hydraulic pressure introduces considerable nonlinearity into the performance of valve 62 in terms of hydraulic flow rates. To compensate for these nonlinearities, the control system 200 of the present invention employs a valve compensation module 212, whose transfer function is illustrated in FIG. 12. Note that the valve 62 does not produce any flow in either direction until the signal VCS reaches an absolute magnitude of somewhat larger than two volts. This nonlinearity is taken care of by the addition of an appropriate voltage level (positive or negative) as shown in FIG. 12. Also, for example, when implement 57 has a weight sufficient to require 500 PSI hydraulic pressure (or thereabouts) to raise it, the block 212 provides a positive and negative linear gain represented by lines 650 and 652, respectively in FIG. 12. When the weight of implement 57 requires about 2000 PSI to raise the implement, block 212 provides positive and negative gain as indicated by lines 656 and 658. The control system 200 learns of the magnitude of the hydraulic pressure required to raise the implement through the learn mode control 214 which is a sequence of steps programmed into the controller 60.

The learn mode control 214 preferably operates in the following manner. With the tractor 30 at rest (not moving) and warmed up so that the hydraulic fluid is within a preferred operating temperature range, and with the front portion 148 of the implement 57 raised so that the plows are out of the ground, the operator pushes the learn button 88. Next, the module 214 provides a command on line 660 which causes the PWM generator 180 to begin to slowly ramp up the VCS signal with positive PWM current at a predetermined rate. The controller 60 then waits until a predetermined rate of movement of the hitch is detected by hitch pot 64, as indicated by the actual hitch position signal on line 66. Specifically, the controller 60 looks for a certain incremental upward movement of the HPA signal within a predetermined brief period of time such as several tenths of a second. In this manner, the controller 60 obtains a relative indication of the weight of the implement by knowing the average voltage value of the VCS signal being applied to the valve that produced the movement of the implement. Thereafter, the controller 60 determines from a stored table of experimentally determined values what the preferred gain or slope for raising (such as slope of line 650 or 656) and the preferred gain or slope for lowering (such as the slope of line 652 or 658) should be. Also, the controller 60 records the initial voltage at which the hitch first began to perceptibly move (at some very minimum threshold rate) and uses that voltage value as the off-set in the postive direction. Similarly, the controller 60 thereafter begins to slowly ramp up the VCS signal with a negative PWM current signal at a predetermined rate, looks for a predetermined rate of downward movement of the hitch, and records and uses that average voltage value of the signal VCS as the offset in the negative direction. For example, if for 2000 PSI hydraulic pressure, the controller 60 notes that the valve 62 first begins to raise the implement at the minimum threshold rate at 2.1 volts, then that voltage is used as the point 666 at which the line 656 intersects the vertical axis in FIG. 12. Similarly, if at 500 PSI hydraulic pressure the controller 60 notes that this minimum threshold level is achieved at 2.25 volts when raising the implement then the line 650 will be made to intersect the vertical axis in graph of FIG. 12 at that voltage, which corresponds to point 660. Likewise, if these minimum lower rate threshold values of signal VCS for 500 PSI and 2000 PSI hydraulic pressures are −2.3 volts and −2.2 volts respectively, the points 662 and 668 on the vertical axis of the graph in FIG. 12 are selected as the start points for lines 652 and 658, respectively. Every time the tractor operator places a new implement upon the hitch 46, the foregoing sequence should be performed so that the transfer function characteristics of block 212 can be tailored to the weight of the implement. In light of the foregoing description, those skilled in the art should appreciate that the valve compensation module 212 and learn mode control 214 provide a technique for greatly improving the overall performance of the automatic feedback control system of the present invention by effectively eliminating the nonlinear hydraulic performance of valve 62 observed between implements of different weight.

The purpose of the slip-sensing control 208 is to send a suitable command to raise the implement whenever the slippage becomes excessive, so as to avoid unwanted digging in the implement or unnecessarily slowing the movement of the tractor until a manual adjustment of the hitch is made by the operator. The generation of such a signal to raise the implement begins with the subtraction of the scaled value of indicated ground speed signal on line 680 from the scaled value of actual ground speed on line 682 by summer 398. Summer 398 outputs the difference on line 684 and it is received as input "A" of divider 540. Input B of divider 540 is the scaled value of indicated ground speed on line 680. The divider block 540 divides the value provided at input A by the value provided by input B. The resulting quotient is output on line 542 as the slip (SL) signal and is an input to block 520, whose transfer function is illustrated in the graph of FIG. 9. The block 520 also receives as an input signal the conditioned and filtered slip rate signal from line 690. The block 520 provides no output until signal SLP reaches a certain minimum threshold specified by the setting of slip-rate pot 100, as indicated by the magnitude of the signal on line 690. Once the signal SLP exceeds this threshold, the output of block 520, which for convenience may be called the slip compensation signal SLC, rises linearly with increasing magnitude of the input signal, as represented in FIG. 9. In FIG. 9, point 694 represents the minimum threshold when the pot 100 is set at a first setting $SR_1$ near its full CCW position, while point 696 represents the minimum threshold level when pot 100 is in a higher setting $SR_2$ near its full CW position. Heavy line 692 and light line 698 show the resulting linear increase in the slip compensation signal when pot 100 is in the setting $SR_1$ and $SR_2$, respectively. The slope of line 692 (or line 698) corresponds to the gain of the slip-sensing control loop 208. This slope and hence the gain of control 208 may be optimized for a given tractor/transmission/wheel combination by a few simple experiments in the field which those skilled in the art would know how to perform. From the foregoing description those in the art will appreciate that the slip-sensing control 208 provides a means by which a slip compensation signal will be provided through summer 386 and valve compensation module 212 and the PWM generator circuit 180 to the electrohydraulic valve so as to raise the implement in proportion to the amount of slip in excess of the slip rate setting of pot 100. The slip rate pot 100 provides the operator with the ability to adjust the slip rate setting to what he considers an optimum value. This also provides a mechanism by which the operator can compensate for different wheel configurations that he may employ with the tractor. Also, it will be appreciated that the slip-sensing control is of great benefit to the draft control system of the present invention, since it provides a remedy for the situation where because of wheel slippage, the draft feedback control 204 would no longer be able to correlate the draft or load forces being produced by the implement with the deviation of the actual engine speed from the target point speed.

The upshift/downshift control 206 provides a further means for the control system 200 to avoid or compensate for possible problems with engine stall out that may occur, especially when engine speed is below the target point speed by an unacceptable amount and is not recovering, but instead is continuing to decrease. The downshift portion 700 of control 206 is provided by blocks 534, 535 and 552, while the upshift portion 702 of control 206 is provided by summer 394 and blocks 530, 532 and 550. In downshift portion 700, the block 534 receives as an input the signal ABT, which indicates the amount by which the actual engine speed is below the target point speed. The block 536 receives as an input the output 478 of gated switch 472, which is the engine speed rate signal ESR when the actual engine speed is below the target point speed. Block 536 produces an output when signal ESR falls below a predetermined value established by the location of line 708 along the negative portion of the horizontal axis of the transfer function shown in block 536. The position of line 708 is selected to reflect a predetermined rate of engine deceleration which indicates that the actual speed of the engine 32 is likely to continue to decrease rather than recover. When the signal on line 706 is in a logical one state and the signal ABT reaches a predetermined positive threshold value determined by the location of line segment 710 along the horizontal axis of the transfer function of block 534, the block 534 will produce a logical one output on line 712. When single shot block 552 detects a logical one value on line 712, it produces a momentary positive pulse on its output 556 which is suitably conditioned by output buffer/amplifier 716 and thereafter delivered to the transmission controller 31, which commands the transmission 33 to downshift into the next lower gear. This provides more torque and allows the engine speed to recover, thus preventing engine stall-out.

In upshift portion 702, summer 394 receives as outputs the buffered, filtered and compensated desired engine speed signal ESD' and the buffered and scaled engine speed signal ESA', which is substracted by summer 394 from signal ESD'. This difference represents the amount by which the actual engine speed is below the desired engine speed. Block 532 receives as an input the output of gated switch 470, which represents the signal ESR (when the actual engine speed is above the desired engine speed). Like in block 536, block 532 will produce a logical one output on line 724 when the input value exceeds a predetermined threshold indicated by the line 726 in the transfer function graph within block 532. When block 530 receives a logical one input on line 724 and when the magnitude of the signal being input by line 720 is below a maximum threshold indicated by vertical line 722 of the transfer function graph within block 530, block 530 will produce a logical one output on line 553. In other words, block 530 will produce a logical one output on line 553 when the actual engine speed is above the desired engine speed and the engine acceleration is increasing above the predetermined threshold indicated by line 726. When single shot block 550 perceives a logical one value on line 553 it produces a momentary logical one pulse on its output 554, which after suitable buffering by output amplifier 730 is sent as an upshift signal to transmission controller 31, which causes the transmission 33 to upshift into the next higher gear. Thus, the upshift/downshift control 206 provides automatic means for downshifting and upshifting of the transmission 33, so that the operator does not have to manually upshift and downshift his transmission to take care of minor changes and conditions such as are produced when driving over a small rise or ridge.

The foregoing detailed description shows that the preferred embodiments of the present invention are well suited to fulfill the objects above stated. It is recognized that those in the art may make various modifications or additions to the preferred embodiments chosen to illustrate the present invention without departing from the spirit and the proper scope of the present invention. For example, the automatic feedback control system of the present invention may be employed in dozers, road graders and other suitable off-road construction industry vehicles and off-road agricultural vehicles. In the case of dozers and road graders, for instance, the ground-engaging implement whose elevation is to be regulated in accordance with the sensed engine lug-down would typically be the blade or scraper. Accordingly, it is to be understood that the protection sought and to be afforded hereby should be deemed to extend to the subject matter defined by the appended claims, including all fair equivalents thereof.

We claim:

1. In a self-propelled vehicle having an engine, ground-engaging traction means for moving the vehicle relative to the ground, and connecting means for attaching a ground-penetrating implement thereto and actuating means for adjusting the elevation of at least a first portion of the implement to vary the ground penetration thereof in response to at least one control signal applied to the actuating means, an automatic feedback control system comprising:

first sensing means for generating a speed parameter signal representative of the actual speed of the engine;

first input means for producing a no-load engine speed signal corresponding to a no-load engine speed;

speed input means for producing a target speed signal which corresponds to a target engine speed which is less than the no-load engine speed;

first difference means for generating a speed error signal representing a difference between the speed parameter signal and the target speed signal; and first control means for operating the actuating means to adjust the elevation of the first portion of the implement at least partially in response to the speed error signal;

second sensing means for generating an elevation parameter signal representive of the elevation of at least the first portion of the implement relative to the vehicle;

third input means for producing a target elevation signal;

second difference means for generating an elevation error signal representing a difference between the elevation parameter signal and the desired elevation signal;

second control means for operating the actuating means to adjust the elevation of the first portion of the implement at least partially in response to the elevation error signal;

mixing means for adjusting the relative influence that the first control means and the second control means has upon the operation of the actuating means; and wherein the mixing means is responsive to the magnitude of the difference between the no-load engine speed and the target engine speed and as the magnitude increases, the mixing means decreases the relative influence of the elevation error signal and increases the relative influence of the speed error signal.

2. A control system as in claim 1, further comprising:

first rate-of-change means for producing an engine acceleration parameter signal representative of the rate at which the actual speed of the engine is changing;

acceleration feedback control means for providing at least a portion of the acceleration parameter signal to the first control means; and wherein the first control means includes means for combining the provided portion of the acceleration parameter signal with at least a portion of the engine speed error signal.

3. A control system as in claim 2, wherein the acceleration feedback control means includes (a) means for determining when the engine speed parameter signal is greater than the target speed signal, (b) means for determining when the engine speed parameter signal is less than the target speed signal, (c) means for providing a first gain in the acceleration feedback control means when the engine speed parameter signal is greater than the target speed signal, and (d) means for providing a second gain in the acceleration feedback control means when the engine speed parameter signal is less than the target speed signal, with the second gain being greater than the first gain.

4. A control system as in claim 1, wherein the control system further comprises:

downshift signal means for providing an downshift command signal to the vehicle only after the actual engine speed falls to a predetermined downshift threshold speed.

5. A control system as in claim 4, wherein the predetermined minimum speed is computed by calculations based at least in part upon the target speed.

6. A control system as in claim 5, wherein the downshift signal means includes means for determining the rate of change of engine speed, and produces a downshift command signal only after the rate of change of engine speed indicates that engine speed is decreasing at a preselected minimum rate.

7. A control system as in claim 5, further comprising: upshift signal means for providing an upshift signal to the vehicle only after the engine speed has increased to a predetermined upshift threshold speed.

8. A control system as in claim 7, wherein the upshift signal means includes means for establishing predetermined upshift threshold speed based at least in part upon the no-load engine speed.

9. A control system as in claim 8, wherein:

the downshift signal means includes means for determining the rate of change of engine speed, and produces the downshift command signal only after the rate of change of engine speed, and produces the downshift command signal only after the rate of change of engine speed indicates that engine speed is decreasing by at least a first preselected minimum rate, and the upshift means include means for detemining the rate of change of engine speed, and produces the upshift command signal only after the rate of change of engine speed indicates that engine speed is increasing by at least a second preselected minimum rate.

10. A control system as in claim 1, further comprising:

first compensation means for adjusting the first control means to compensate for nonlinear operating characteristics of the actuating means.

11. A control system as in claim 10, further comprising:

second compensation means for adjusting the first control means to compensate for the weight of the implement applied to the actuating means at a selected interval of time.

12. A control system as in claim 1, wherein the first sensing means includes a sensor for sensing the relative position of an actuator means affecting movement of a throttle of the engine, and means for calibrating the first sensing means under no-load engine conditions by associating a predetermined number of output values from the sensor with respective ones of a plurality of distinct positions of the actuator means which cause the engine to operate at different speeds and storing a value corresponding to the actual engine speed for each of the distinct positions of the actuator means.

13. A control system as in claim 12, wherein the sensor is a potentiometer and the actuator means is a throttle lever rotatable about a pivot point.

14. A control system as in claim 1, wherein the second input means includes means for producing a desired draft load signal which corresponds to a desired reduction in engine speed when the engine is under load, and first difference means for generating the target speed signal from the no-load engine speed signal and the desired draft load signal.

15. In a self-propelled vehicle having an engine, ground-engaging traction means for moving the vehicle relative to the ground, and connecting means for attaching a ground-penetrating implement thereto and actuating means for adjusting the elevation of at least a first portion of the implement to vary the ground penetration thereof in response to at least one control signal applied to the actuating means, an automatic feedback control system comprising:

first sensing means for generating a speed parameter signal representative of the actual speed of the engine;

first input means for producing a no-load engine speed signal corresponding to an engine speed when the vehicle is not under load;

second input means for producing a draft load signal expressed as a function of reduction in the speed of the engine when under load;

first difference means for generating a target speed signal from the no-load engine speed signal and draft load signal;

second difference means for generating a speed error signal representing a difference between the speed parameter signal and the target speed signal;

first control means for operating the actuating means to adjust the elevation of the first portion of the implement at least partially in response to the speed error signal;

third input means for adjusting, and limiting the rate at which the actuating means lowers the implement;

means for determining a slip signal representing a difference between a true ground speed signal and an indicated ground speed signal;

first comparison means of producing an excessive slip signal when the slip signal indicates the amount of slip has passed a predetermined threshold level;

second control means for operating the actuating means to raise the first portion of the implement in response to the excessive slip signal;

first rate-of-change means for producing an acceleration parameter signal representative of the rate at which the actual speed of the engine is changing; and acceleration feedback control means for providing at least a portion of the acceleration parameter signal to the first control means;

wherein the first control means includes means for combining at least a portion of the acceleration parameter signal with at least a portion of the engine speed error signal; and wherein the acceleration feedback control means includes (a) means for determining when the engine speed parameter signal is greater than the target speed signal, (b) means for determining when the engine speed parameter signal is less than the target speed signal, (c) means for providing a first gain in the acceleration feedback control means when the engine speed parameter signal is greater than the target speed signal, and (d) means for providing a second gain in the acceleration feedback control means when the engine speed paarameter signal is less than the target speed signal.

* * * * *

UNITED STATES PATENT AND TRADEMARK OFFICE
CERTIFICATE OF CORRECTION

PATENT NO. : 4,846,283

DATED : July 11, 1989

INVENTOR(S) : BATCHELLER

It is certified that error appears in the above-identified patent and that said Letters Patent is hereby corrected as shown below:

In column 22, line 57, "speed", first occurrence, should be --second--.

Signed and Sealed this

Twenty-sixth Day of June, 1990

Attest:

HARRY F. MANBECK, JR.

*Attesting Officer*          *Commissioner of Patents and Trademarks*

UNITED STATES PATENT AND TRADEMARK OFFICE
CERTIFICATE OF CORRECTION

PATENT NO. :  4,846,283
DATED      :  July 11, 1989
INVENTOR(S):  Kamyab Aghai-Tabriz et al It is certified that error appears in the above-identified patent and that said Letters Patent is hereby corrected as shown below:

On the title page, in item "[75]", please add the joint inventor as follows:  --Kamyab Aghai-Tabriz, Fargo, North Dakota--.

Signed and Sealed this

Twenty-sixth Day of February, 1991

*Attest:*

HARRY F. MANBECK, JR.

*Attesting Officer*   *Commissioner of Patents and Trademarks*